Patented Dec. 26, 1950

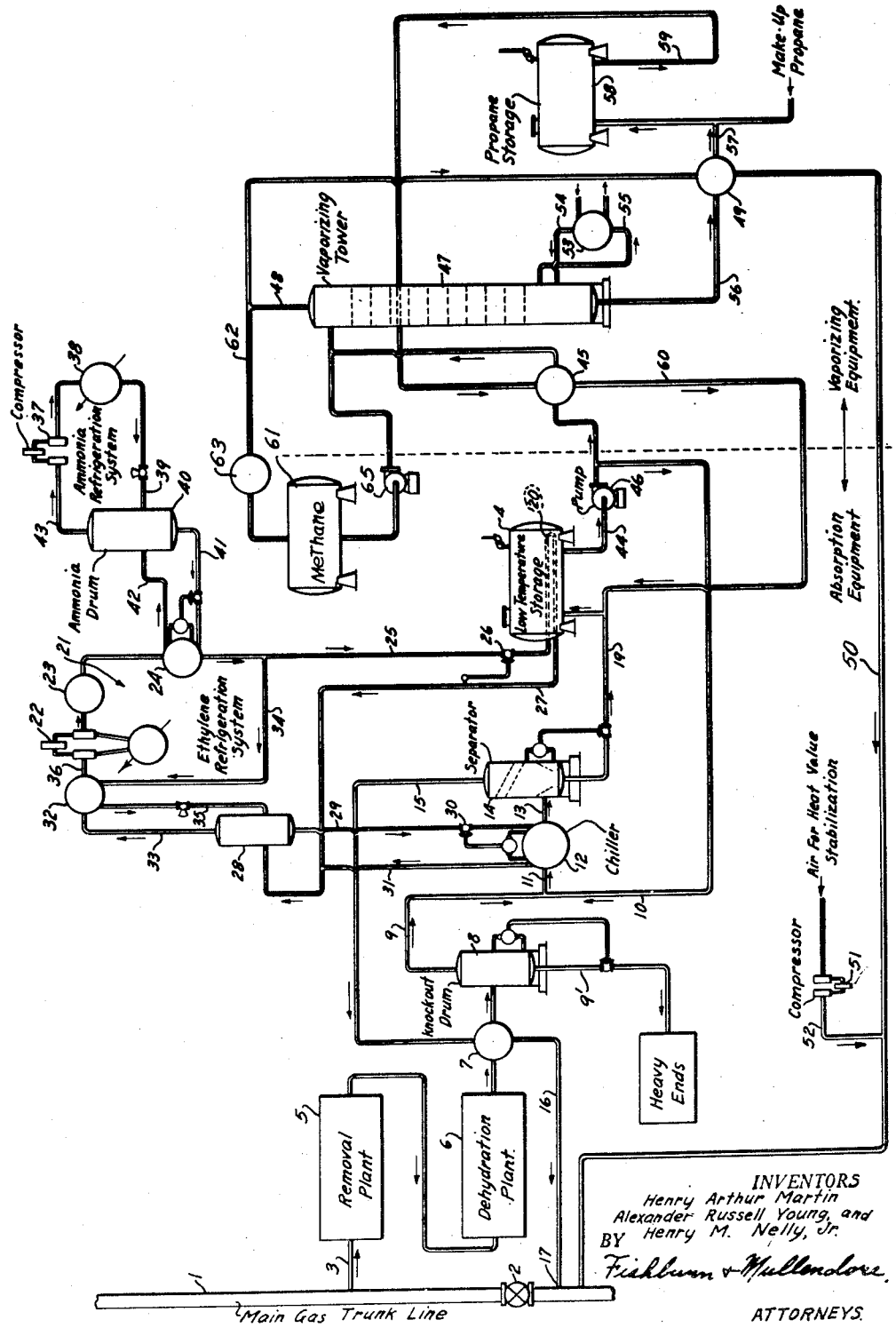

2,535,148

UNITED STATES PATENT OFFICE 2,535,148

METHOD OF STORING NATURAL GAS

Henry Arthur Martin, Kansas City, Kans., Alexander Russell Young, Kansas City, Mo., and Henry M. Nelly, Jr., Houston, Tex., assignors to J. F. Pritchard & Co., Kansas City, Mo., a corporation of Missouri Application April 18, 1946, Serial No. 663,232

5 Claims. (Cl. 48—190)

1

This invention relates to gas supply systems and particularly to a method and apparatus for storing gas at times of low demand to meet peak demands of a market. For example, when gas is transported from the field or source of supply to a distant market, the flow capacity of the pipe line system is kept substantially constant in order to maintain optimum efficiency for which the system was designed. On the other hand, the market demand for gas varies widely through the seasons and even hours of the day. During some hours the market may demand only a small portion of the line flow and during other hours, the demand exceeds the capacity of the line. Consequently, during times of low demand the system must be operated at less than its capacity flow and when the market demand exceeds the capacity there is a serious break in the gas service.

The principal objects of the present invention are to provide a method and apparatus for storing gas in liquid form at temperatures substantially higher than the normal liquefaction temperature of the gas, by dissolving or absorbing the gas with an absorbent that is liquid at the storage temperature during times of low demand and to provide for vaporizing or desorbing the natural gas from the absorbent while retaining the absorbent in liquid form to effect ready separation of the gas for filling in the periods of peak demand, and thereby permit constant operation of the pipe line system at substantially optimum efficiency regardless of variation in the market requirements.

Other objects of the invention are to provide a method of storage and storage apparatus capable of safely and economically storing large volumes of gas adjacent the market to meet excessive demands or along the pipe line system for filling in variations in the flow.

In accomplishing these and other objects of the invention, we have provided an improved method and apparatus for storing gas as illustrated in the accompanying drawing wherein:

The single figure is a diagrammatic view of the storage apparatus and the pipe line with which it is associated.

Referring more in detail to the drawing:

1 designates a main trunk line of a gas transportation system leading from a source of supply to a distant market and through which gas is caused to flow by expansion of the gas from one compressor station to the next in accordance with present practice of transporting gas at high pressures; for example, 350 p. s. i. g.

2

As above stated, the maximum transport capacity of the pipe line is a constant value, the flow being based on diameter and length of the line, the compressing stations' power and displacement, the maximum pressure the market must have for its distribution, and the maximum pressure for which the line was designed. Consequently, it is impractical to increase the transport capacity of a line beyond its calculated optimum flow and it is also not economical to operate the line below its capacity flow. It is, therefore, important to maintain optimum, uniform constant flow through the line and to handle the excess gas at time of low demand as relief storage which can be called upon to aid in supplying the market during times of peak or excessive demand.

In carrying out the present invention, we provide the main trunk line 1 with a pressure regulating valve 2 capable of maintaining a constant pressure; for example, 350 p. s. i. g. in the line so that gas may be diverted from the main trunk line through a pipe line 3 to a storage apparatus embodying the features of the present invention and which involves absorption of the gas by a liquid absorbent at low temperatures so that the liquefied gas can be stored in liquid form in the absorbent and at temperatures substantially higher than the normal liquefaction temperature of the gas contained in relatively small storage vessels designated 4.

Gas taken from the trunk line for storage purposes often contains carbon dioxide ($CO_2$) and hydrogen sulphide ($H_2S$) which freeze out in the storage cycle to cause plugging of the apparatus so that it is desirable to pass the gas through a scrubber 5 that is connected into the line 3 and wherein the carbon dioxide and hydrogen sulphide content is removed. The gas may also contain moisture which will interfere with storage of the gas under low temperature so that it is desirable to pass the gas through a dehydrator 6 also connected in the line 3 to dry the gas to a dew point of approximately —150°. The gas then initially is cooled by passing it through a heat exchanger 7 also connected in the line 3 and from which the cooled gas is discharged to knock-out drum 8 to remove heavy material which might remain in the gas such as traces of lubricating oil, butanes, and other heavy ends which are drained from the bottom of the drum through a pipe 9' leading to a place of storage. The denuded gas is then discharged from the knock-out drum through a pipe 9 that is connected with an absorbent inlet pipe 10 having common connection with a pipe 11 through which the mixture is discharged into a chiller 12. The absorbent liquid may be of any suitable type that is, a readily liquefiable hydro-carbon gas to provide an absorbent that is liquid at the absorbing and storage temperatures and can be kept liquid at the desorbing temperature of the gas such as propane or the like which is readily liquefiable and will retain the natural gas in solution. From the chiller 12 the mixture is delivered through a pipe 13 into a gas separator 14 where the unabsorbed gas is separated from the liquid component of the mixture. The separated gas having a temperature of approximately −140° F. is delivered from the top of the separator through a pipe 15 to the precooler 7 for initially cooling the dehydrated gas to a temperature of −35° F. After passing through the heat exchanger, the unabsorbed gas is returned to the main gas line through a pipe 16 as it has substantially the same heating value as original gas from the pipe line, the pipe 16 being connected with the main trunk line on the downstream side of the pressure regulator as indicated at 17. If desired this gas, could be used elsewhere and not returned to the main line.

The absorbed and liquefied mixture is discharged from the bottom of the separator 14 through a pipe 19 that is connected with the storage vessels 4. During storage, the temperatures and pressures are maintained in storage by a refrigerant circulated through coils 20 contained in the drums so that the natural gas is retained in the absorbent. In order to supply the refrigerant, which may be ethylene, the apparatus includes a refrigerating unit 21 comprising a refrigerant compressor 22 discharging to a precooler 23 wherein the discharged gas is cooled to 65° F. The cooled gas is then passed to the condenser 24 from which condensed refrigerant is supplied to the coils 20 through a pipe 25 having a regulator 26 to deliver the refrigerant to the coils at a temperature of −149° F. for maintaining the stored liquid at a temperature of −140° F. The refrigerant from the coils is discharged through a pipe 27 to an ethylene knock-out drum 28, from which refrigerant is supplied to the chiller 12 through a pipe 29 having a liquid level controlled regulating valve 30 for passing the refrigerant into the chiller for maintaining the temperature of the propane and gas mixture at approximately a temperature of −140° F. The refrigerant is returned from the chiller to the knock-out drum 28 through a pipe 31 that is connected with the pipe 27. The refrigerant is delivered from the knock-out drum 28 to a superheater 32 through a pipe 33. The superheater is supplied with refrigerant from the pipe 25 through a pipe 34 at a temperature of −18° F. at approximately 280 pounds pressure. The refrigerant is passed from the superheater to the knock-out drum through a pipe 35 at a temperature of −66° F. and 270 pounds pressure. The refrigerant is supplied to the intake of the compressor from the superheater through a pipe 36 at a temperature of −50° F. to complete the ethylene cycle.

In order to supply the temperature needed at the condenser 24, the apparatus also includes an ammonia refrigerating unit including a compressor 37 having a discharge to an ammonia water condenser 38 from which liquid refrigerant is discharged through a pipe 39 to a knock-out drum 40 at a temperature of 60° F. and a pressure of 105 pounds. The liquid refrigerant is discharged from the lower end of the knock-out drum through a pipe 41 to the ethylene condenser. The ammonia refrigerant is returned to the knock-out drum through a pipe 42 at a temperature of −28° F. The ammonia gas separated in the knock-out drum at approximately atmospheric pressure is returned to the compressor through a pipe 43.

In order to vaporize or desorb the stored gas for supplying the main trunk line at times of peak demand, the stored liquid gas is withdrawn from the storage vessel through a pipe 44 and discharged to a heat exchanger 45 under pressure of a pump 46. In the heat exchanger, the liquid is warmed to a temperature of −90° F. and discharged into the upper portion of a vaporizing tower 47 wherein the gas is released from the top through a pipe 48 at a temperature of approximately −30° F. and at a pressure of 375 pounds, the discharged gas passes through a heat exchanger 49 where the temperature is raised to 35° F. and is returned to the main trunk line on the downstream side of the connection 17 through a pipe 50. If desired, the gas may be stabilized by introduction of air into the line 50 by means of a compressor 51 having connection with a pipe 52 that is connected with the pipe 50. The absorbent remains a liquid and gravitates to the bottom of the vaporizing tower so that the gas is readily separated therefrom at the temperatures and pressures carried within the tower.

In order to bring the liquid in the vaporizer to temperature for releasing the gas, the liquid in the bottom of the tower is circulated through a heater 53 by way of inlet and outlet pipes 54 and 55. The heater 53 illustrated may be supplied with a heating medium from any suitable source. The propane or absorbent passes to the bottom of the tower at a temperature of about 150° F. but is kept in liquid form incidental to the pressure at which the natural gas is withdrawn. The liquid propane is carried through a pipe 56 to the heat exchanger 49 whereby the heat is used in raising the temperature of the gas returned to the main trunk line.

After interchange of heat the propane is discharged at approximately 80° F. temperature through a pipe 57 having connection with propane storage drums 58. Propane is withdrawn from the drums through a pipe 59 and passed through the heat exchanger 45 where the temperature of the propane is lowered to substantially a −130° F. through contact with the liquid withdrawn from the storage vessels 4. From the heat exchanger the chilled propane is passed through a pipe 60 having connection with the pipe 19. The propane at a temperature of −130° F. used to absorb the gas, is discharged through pipe 10 to the absorption system by means of pump 46 that is connected to the low temperature storage by pipe 44.

If desired, liquefied gas (methane) may be separated and stored in separate storage vessels 61. In this case, the gas passing from the vaporizing tower 47 is diverted through a pipe 62, passed through a condenser 63 and discharged as a liquid into a storage vessel 61. The methane gas is withdrawn from storage 61 by a pump 65 and returned to the tower 47 and revaporized. The vaporized gas may then be delivered to the trunk line as previously described.

Assuming that the apparatus is assembled as described and that, by way of example, twelve million standard cubic feet of gas per day is diverted from the trunk line through the pipe line 3. The gas is relieved of the carbon dioxide and hydrogen sulphide content in the scrubber indicated at 5 and passed on to the dehydration plant where the gas is dehydrated to a dew point of approximately −150° F. Assuming that the gas after leaving the dehydrating plant has a temperature of 50° F., the temperature is reduced to a −35° F. in the heat exchanger 7 before it is delivered to the knock-out drum 8 in which is removed the heavy ends, lubricating oils and so forth, the heavy ends being discharged through the pipe 12. The gas passes from the top of the knock-out drum 8 and is contacted with the liquefied propane and gas mixture having a temperature of −130° F. upon injection of the gas and liquid mixture into the pipe 11 for discharge into the chiller 12. Upon contact of the liquid mixture and gas, the temperature of the mixture rises to −65° F., but the temperature is again reduced to −140° F. in the chiller so that the mixture is delivered to the main separator at a temperature of −140° F. and pressure of 335 pounds. The liquefied mixture is then passed to the storage vessels 4 through the pipe 19. The unliquefied gas is discharged from the top of the main separator through a pipe 15 and is passed through the heat exchanger 7 where it takes up the heat from the incoming gas so that the incoming gas is discharged to the knock-out drum 7 at the temperature of −35° F. above mentioned, and the unliquefied gas is returned to the main gas line at approximately 30° F. through the pipe 16.

At the temperatures, pressures and volume of gas mentioned, approximately five million standard cubic feet of gas will be absorbed and delivered as a liquid mixture to the storage vessels 4 leaving seven million cubic feet to be returned to the trunk line through the pipe 16. The amount of propane mixture that will be circulated and stored will be approximately sixty thousand gallons per day, making the total propane circulated and stored to hold fourteen million standard cubic feet of natural gas, equivalent to one hundred and fifty thousand gallons measured at 60° F.

When the gas is to be returned to the main trunk line it is withdrawn from storage 4 by pump pressure and circulated through the heat exchanger 45 where the temperature is raised to −90° F. and discharged into the vaporizer 47 where it is raised to a temperature of −30° F. and passed through the heat exchanger 49 from where it is discharged at a temperature of 35° F. to the pipe 59 that is connected with the trunk line.

The liquid content of the vaporizer 47 is heated so that the temperature is such as to vaporize the absorbed gas. The propane is returned through the pipe 56 at approximately 150° F. temperature where the temperature is lowered by contact with the condensed gas being returned to the trunk line. The propane make-up is drawn from the propane storage drums through the pipe 58 and passed through the heat exchanger 45 where the temperature is lowered to −130° for admission into the storage liquid vessels 4.

When liquid gas is to be stored separately from the liquid stored in the vessels 4, the vapor from the tower 47 is diverted through the pipe 62, condensed in the condenser 63 and discharged into the storage vessels 61. When the liquid is to be withdrawn from the storage 61, it is pumped back to the vaporizing tower, re-vaporized, and delivered as vapor through the pipe 48 to the main trunk line or to any other place of use.

It is to be understood that the above mentioned pressures and temperatures are illustrative and may be varied to suit conditions without departing from the spirit of the invention.

From the foregoing it is obvious that we have provided a simple and economical storage for relatively large volumes of gas in relatively small storage vessels. It is also obvious that the liquefied gas is readily converted to gas at near main pipe line pressure so that it is readily returned to the main line when the storage is needed as in times of peak demand or when the line flow is insufficient to maintain the market requirements.

What we claim and desire to secure by Letters Patent is:

1. The method of storing natural gas in liquid form at a temperature substantially higher than the normal liquefaction temperature of said natural gas including, absorbing the natural gas in a normally gaseous hydrocarbon maintained at low temperature and in liquid state during said absorption and desorption of the natural gas, storing the liquid absorbent containing the natural gas at a temperature sufficiently low to retain said hydrocarbon in liquid state and the natural gas in absorption, withdrawing the liquid absorbent containing the natural gas from storage when natural gas is needed, and vaporizing the natural gas from the absorbent while maintaining the absorbent in liquid state to effect separation of the natural gas from the absorbent.

2. The method of storing natural gas in liquid form at a temperature substantially higher than the normal liquefaction temperature of said natural gas including absorbing the natural gas in a normally gaseous hydrocarbon maintained at low temperature and in liquid state during absorption and desorption of the natural gas, storing the liquid absorbent containing the natural gas at a temperature sufficiently low to retain said hydrocarbon in liquid state and the natural gas in absorption, withdrawing the liquid absorbent containing the natural gas from storage when natural gas is needed, vaporizing the natural gas from the absorbent while maintaining the absorbent in the liquid state to effect separation of the natural gas from the absorbent, and passing a normally gaseous hydrocarbon in heat exchange contact with the absorbent withdrawn from storage to effect liquefaction thereof for supplying the liquid absorbent.

3. The method of storing natural gas in liquid form at a temperature substantially higher than the normal liquefaction temperature of said natural gas including, absorbing the natural gas in a normally gaseous hydrocarbon maintained at low temperature and in liquid state during absorption and desorption of the natural gas, storing the liquid absorbent containing the natural gas at a temperature sufficiently low to retain said hydrocarbon in liquid state and the natural gas in absorption, withdrawing the liquid absorbent containing the natural gas from storage when natural gas is needed, vaporizing the natural gas from the absorbent while maintaining the absorbent in liquid state to effect separation of the natural gas from the absorbent, and returning the separated absorbent in heat exchange relation with the absorbent withdrawn from storage for re-absorption of incoming natural gas.

4. The method of storing natural gas in liquid form at a temperature substantially higher than the liquefaction temperature of the natural gas including, mixing the natural gas with a normally gaseous hydrocarbon that is readily liquefiable at low temperature for effecting solution of the natural gas, maintaining the normally gaseous hydrocarbon in liquid state during solution of the natural gas, storing the hydrocarbon in a liquid state at low temperature while retaining the natural gas in solution at a temperature sufficiently low to retain the natural gas, withdrawing the liquid hydrocarbon containing the dissolved gas from storage when natural gas is needed, and vaporizing the natural gas from said hydrocarbon while the hydrocarbon is retained in liquid state to effect separation of the gas.

5. The method of storing natural gas in liquid form at a temperature substantially higher than the liquefaction temperature of the natural gas including, contacting the natural gas with liquid propane to effect absorption of the natural gas, storing the propane and the absorbed natural gas at a temperature sufficiently low to retain the natural gas in absorption within the liquid propane, withdrawing the liquid propane containing the natural gas in absorption from storage when natural gas is needed and vaporizing the natural gas while maintaining the propane in liquid state to effect separation of the gas from the propane.

HENRY ARTHUR MARTIN.
ALEXANDER RUSSELL YOUNG.
HENRY M. NELLY, Jr.

REFERENCES CITED

The following references are of record in the file of this patent:

UNITED STATES PATENTS

| Number | Name | Date |
| --- | --- | --- |
| 2,423,156 | Reid | July 1, 1947 |

OTHER REFERENCES

"Gas Age," June 1, 1944, page 25.